(12) United States Patent
Ohga et al.

(10) Patent No.: US 8,014,599 B2
(45) Date of Patent: Sep. 6, 2011

(54) PROFILE ADJUSTMENT METHOD, APPARATUS, AND PROGRAM

(75) Inventors: Manabu Ohga, Kanagawa (JP); Kenichi Naito, Tokyo (JP); Hayato Kubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 903 days.

(21) Appl. No.: 12/015,972

(22) Filed: Jan. 17, 2008

(65) Prior Publication Data

US 2008/0158579 A1 Jul. 3, 2008

Related U.S. Application Data

(62) Division of application No. 10/242,701, filed on Sep. 13, 2002, now Pat. No. 7,339,700.

(30) Foreign Application Priority Data

Sep. 14, 2001 (JP) .................................. 2001-279602

(51) Int. Cl.
*G06K 9/00* (2006.01)

(52) U.S. Cl. .......................... 382/167; 382/162; 382/163

(58) Field of Classification Search .................. 382/162, 382/163, 167; 345/581, 603, 598, 599; 358/1.9, 358/518, 530
See application file for complete search history.

(56) References Cited

FOREIGN PATENT DOCUMENTS

| JP | 361146090 A | * | 7/1986 |
| JP | 08-279918 | | 10/1996 |
| JP | 08-307714 | | 11/1996 |

\* cited by examiner

*Primary Examiner* — Anh Hong Do
(74) *Attorney, Agent, or Firm* — Fitzpatrick, Cella, Harper & Scinto

(57) ABSTRACT

A color processing device performs a quantitative evaluation not influenced by the experience and sensitivity of a user, upon adjustment of a profile. The adjustment of first conversion data for converting device independent data included in a profile describing characteristics of a device into device dependent data is achieved by inputting sample data, which is the device independent data, converting the sample data into the device dependent data using the first conversion data, converting the converted device dependent data into the device independent data using second conversion data which is conversion data included in the profile and which is conversion data for converting the device dependent data into the device independent data, and calculating the color difference between the sample data and the device independent data.

7 Claims, 13 Drawing Sheets

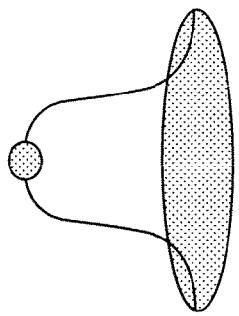
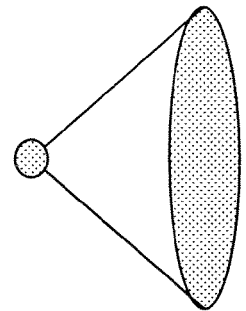
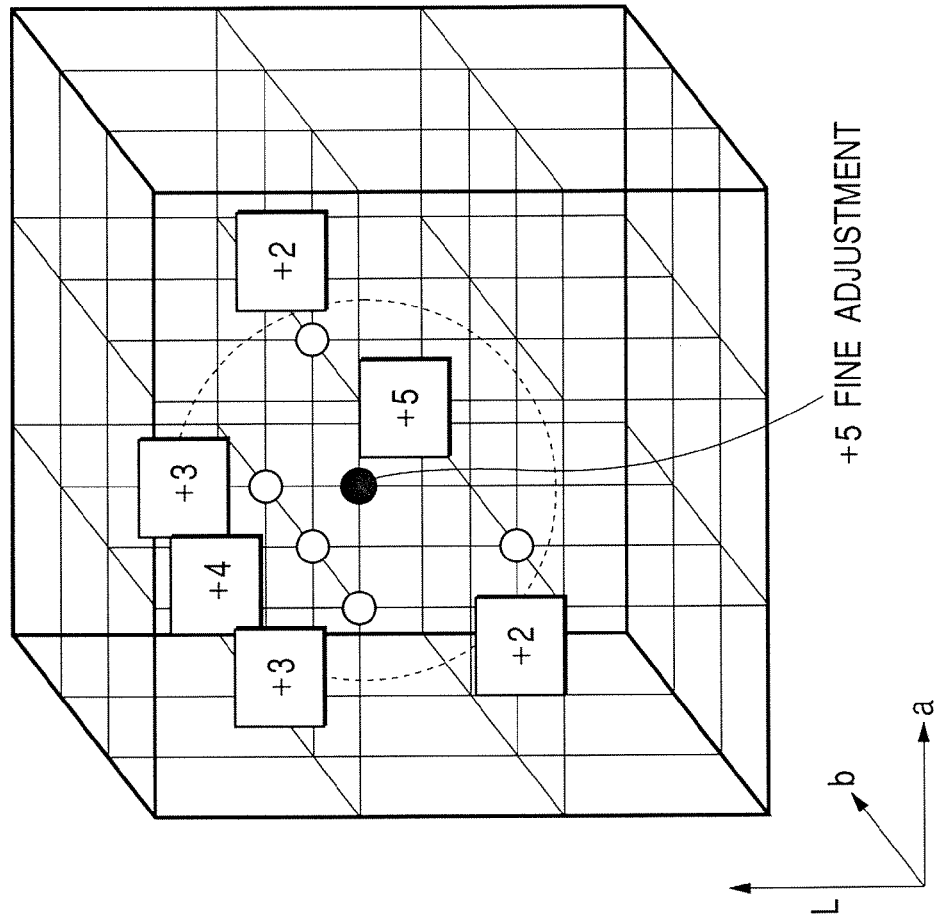

| HISTORY | |
|---|---|
| 1101, 1102: ↶ ↷ \| ✂ \| 🔍 \| 📄 📄  (1103, 1104, 1105) | |

| SELECTION/ADJUSTMENT | EVALUATION(ΔE AVERAGE) |
|---|---|
| PROFILE IS OPENED | 0.9447 |
| ■ SPOT SELECTION/LCh ADJUSTMENT | 0.9442 |
| ■ SPOT SELECTION/LCh ADJUSTMENT | 0.9426 |
| ▓ SPOT SELECTION/LCh ADJUSTMENT | 0.9398 |
|  |  |
|  |  |
|  |  |
|  |  |

EVALUATION-SPOT SELECTION/Lch ADJUSTMENT

ΔE:
MAXIMUM: 5.5923
MINIMUM: 0.0440
AVERAGE: 0.9398

OK

PROFILE ADJUSTMENT METHOD, APPARATUS, AND PROGRAM

RELATED APPLICATIONS

This application is a division of co-pending application Ser. No. 10/242,701, filed Sep. 13, 2002, which is incorporated by reference herein in its entirety, as is fully set forth herein, and claims the benefit of priority under 35 U.S.C. §119, based on Japanese Priority Application No. JP 2001-279602, filed Sep. 14, 2001, which is incorporated by reference herein in its entirety.

BACKGROUND OF THE INVENTION

1. Field of the Invention

The present invention relates to techniques for adjusting a profile describing characteristics of a device.

2. Related Background Art

In a conventional color adjustment, a color adjustment is performed to a specific image and the thus adjusted image is then printed out. However, if the color adjustment is performed to the specific image, each time the image to be objective is changed, it is necessary that the color adjustment is redone every time.

On the other hand, if color matching is performed using a device profile (hereinafter, referred to as a profile) describing characteristics to each input/output device, it becomes possible to perform a color management consistency from input to output. In this method, even if the image to be objective is changed, there is no necessity that the color adjustment is redone. In FIG. 14, a conceptual view of general color matching is shown.

Input data of a color space dependent on a source device such as RGB or CMYK is converted into XYZ data or Lab data of a color space (PCS: Profile Connection Space) independent of a device by an input profile. Since a color out of a color reproduction range of an output device can not be represented by the output device, in order that all the colors are contained in the color reproduction range of the output device, a color space compression is performed to the input data converted into data of the color space independent of the device. And, after the color space compression is performed, the input data is converted from the color space independent of the device into the color space dependent on the output device such as RGB or CMYK.

However, even in color matching using such a profile, if accuracy of the used profile is not sufficient, ideal color matching results can not be obtained. Besides, even if the profile accuracy immediately after making is sufficient, device characteristics change by aging or the like, and if the profile is not adjusted, there is also a case that satisfactory color matching results can not be obtained.

Therefore, in case that sufficient profile accuracy can not be obtained, and in case that the profile goes not to match the device characteristics, the color adjustment of the profile becomes necessary.

A conventional color adjustment method of a profile is performed by a user performing the color adjustment with monitor-displaying the image to be objective, and the results are reflected on the profile.

However, since image quality evaluation of the color adjustment was by eye observation evaluation of the user, quality of the adjusted profile was influenced by experience and sensitivity of the user.

Besides, in the color adjustment by the eye observation evaluation on a monitor, it was hard to detect a different color (or color gamut) from an original image on a preview image, and if not experienced, it was difficult to master.

SUMMARY OF THE INVENTION

The present invention has been made in view of the above points, and its objects are as follows.

An object is to make it possible to perform a quantitative evaluation not influenced by experience and sensitivity of a user, upon adjustment of a profile.

Another object is to make it possible to check a history of adjustment by making it possible to register adjustment to the history.

One invention described in this application is directed to a profile adjustment method for adjusting first conversion data for converting device independent data included in a profile describing characteristics of a device into device dependent data, comprising the steps of inputting sample data which is the device independent data, converting the sample data into the device dependent data using the first conversion data, converting the converted device dependent data into the device independent data using second conversion data which is conversion data included in the profile and which is conversion data for converting the device dependent data into the device independent data, and calculating a color difference between the sample data and the device independent data.

Another invention described of this application is directed to a profile adjustment method comprising:

an adjustment step of adjusting first conversion data for converting device independent data included in a profile describing characteristics of a device into device dependent data, an evaluation step of evaluating results of the adjustment, and a registration step of registering the adjustment in a history, wherein the history is displayed, and an evaluation corresponding to the adjustment registered in the history is displayed.

BRIEF DESCRIPTION OF THE DRAWINGS

FIGS. 7A, 7B and 7C are conceptual views showing spot color adjustment;

DESCRIPTION OF THE PREFERRED EMBODIMENTS

Embodiment 1

Although color adjustment of a profile may be performed to any profile of an input profile of a digital camera or a scanner, a monitor profile of a monitor, and an output profile of an RGB printer or a CMYK printer, this embodiment will be described using the output profile of the CMYK printer as an example.

Besides, although as a sample image used for color adjustment, any image of an RGB image and a CMYK image may be utilized in accordance with application, this embodiment will be described using the CMYK image as an example.

Besides, a profile describes characteristics of a device and describes a relation between device dependent data and device independent data (PCS data). This embodiment will be described using an ICC profile according to a format determined by ICC (International Color Consortium). The ICC profile includes A2B as data for converting device dependent data into PCS data, B2A as data for converting PCS data into device dependent data, color reproduction range information on a device (gamut tag), etc.

Figure 1:
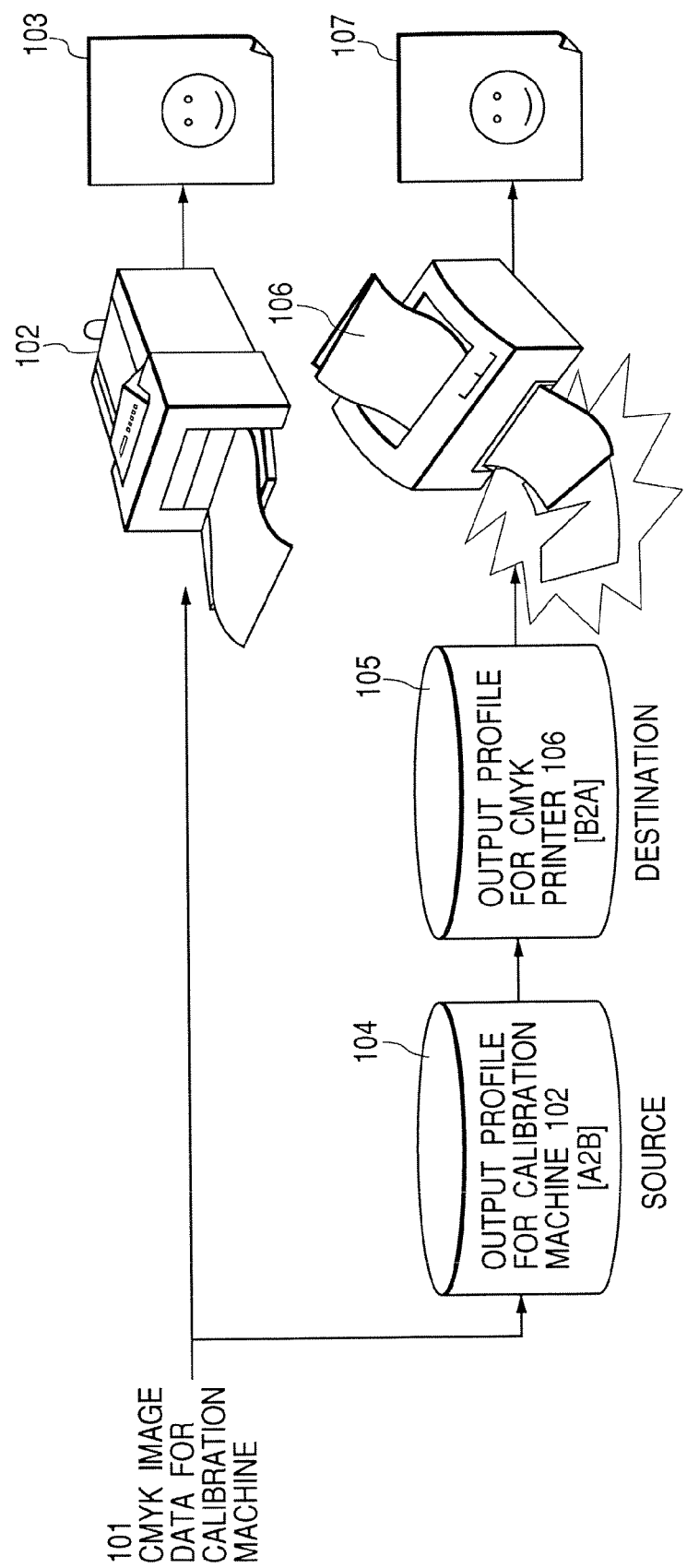
FIG. 1 is a system construction diagram in case that a CMYK printer is utilized in place of a calibration machine.

Before color adjustment of a profile is described, an example of a color matching system construction in case that a CMYK printer is used in place of a calibration machine, is shown in FIG. 1.

In FIG. 1, reference numeral 101 denotes CMYK image data for calibration machine showing an image for color calibration output, reference numeral 102 denotes a calibration machine, reference numeral 103 denotes a color calibration output matter printed out from the calibration machine 102, reference numeral 104 denotes an output profile (source profile) of the calibration machine 102 as a target, reference numeral 105 denotes an output profile (destination profile) of a CMYK printer, reference numeral 106 denotes the CMYK printer, and reference numeral 107 denotes a printed-out matter from the CMYK printer 106.

Utilizing profile preparation software or the like, the output profile 105 of the CMYK printer 106 is prepared. Note that as the output profile 104 of the calibration machine 102, it is supposed that optimum one has been prepared in advance.

Next, to the CMYK image data 101 for calibration machine, color matching is performed by setting the output profile 104 as a source profile and the output profile 105 as a destination profile. More specifically, the CMYK image data 101 for calibration machine is converted into PCS data using A2B data of the output profile 104 for calibration machine, and converted into CMYK data for CMYK printer using B2A data of the output profile for CMYK printer.

In general, in case of performing color calibration, a color calibration output image 101 is printed out from the calibration machine 102. The cost of the calibration machine is high and a long time is required for printing out. Therefore, if the same color reproduction as a color calibration output utilizing the calibration machine, utilizing an inexpensive CMYK printer and color matching, can be realized, the cost can be reduced, and in addition, the printing time can also be shortened.

If a profile for CMYK is properly prepared, the printed-out matter 107 in which substantially the same color reproduction as the color calibration output matter 103 output from the calibration machine is realized, is obtained. However, in case of not obtaining sufficient profile accuracy, color adjustment of the profile becomes necessary.

In the color matching system of FIG. 1, it is desirable that the color taste of the printed-out matter 107 from the CMYK printer matches the color taste of the color calibration output matter from the calibration machine 102. Therefore, in this embodiment, using the calibration machine 102 as a target device, in order to adjust color reproduction of the CMYK printer, B2A data of the output profile for CMYK printer is adjusted.

(Adjustment of Profile)

Hereinafter, as adjustment of a profile, an example in which color adjustment is performed to the output profile 105 of the CMYK printer 106, will be described.

In color adjustment, the optimum color adjustment is performed by combining an eye observation evaluation by a sample image for color adjustment and a quantitative evaluation by color difference.

Figure 2:
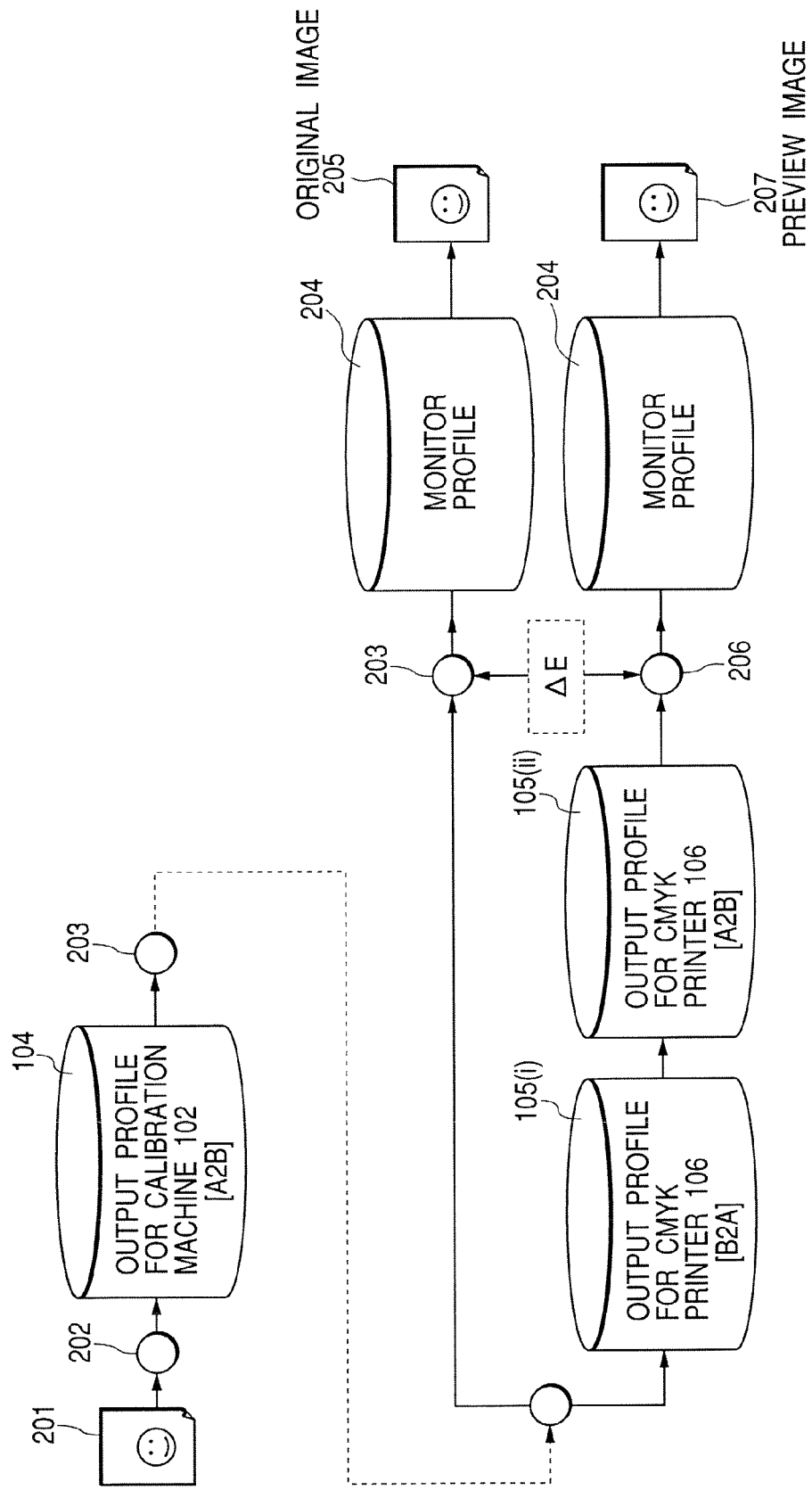
FIG. 2 is a color matching construction necessary for profile color adjustment.
Figure 3:
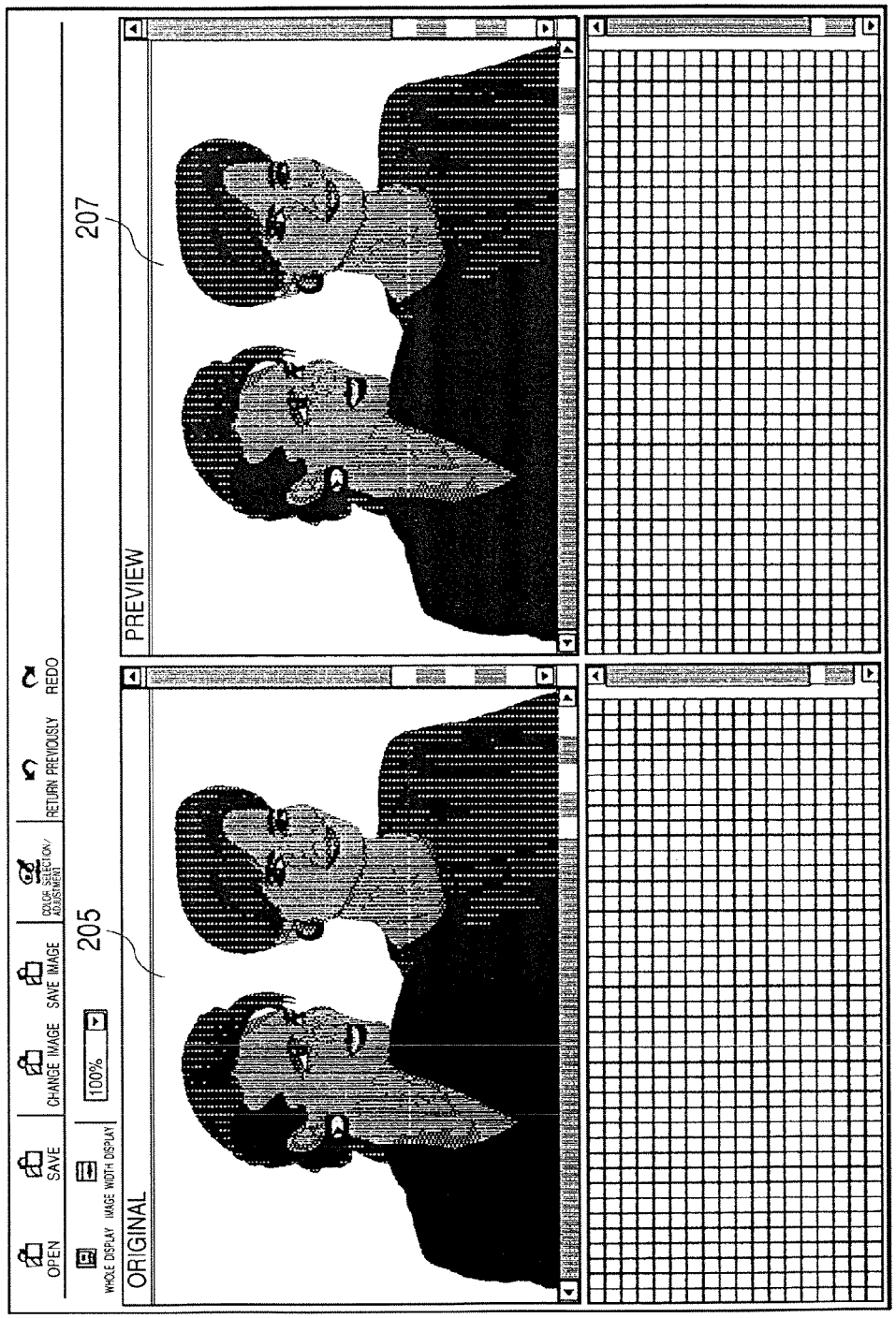
FIG. 3 is a monitor display screen.

FIG. 2 shows a system construction of color matching necessary for color adjustment of a profile, using a display image in this embodiment, and FIG. 3 shows a monitor display screen for color adjustment of the profile in this embodiment.

In FIG. 2, reference numeral 201 denotes a sample image for color adjustment, reference numeral 202 denotes a CMYK value of the sample image for color adjustment, and reference numeral 203 is a Lab value (or an xyz value) obtained by applying A2B data of the output profile 104 of the calibration machine 102 to the CMYK value 202. Reference numeral 204 denotes a monitor profile of a monitor in which a user performs color adjustment, and reference numeral 205 denotes an image displayed based on monitor RGB in which color matching is performed by applying the output profile 104 of the calibration machine 102 and the monitor profile 204 to the sample image.

Reference numeral 206 denotes a Lab value obtained by applying B2A data of the output profile 105 of the CMYK printer 106 to the Lab value 203, and further applying A2B data of the output profile of the CMYK printer 106 to it. And, reference numeral 207 denotes an image displayed based on monitor RGB in which color matching is performed by applying the monitor profile 204 to the Lab value 206.

The Lab value 203 is equivalent to the Lab value in case that the CMYK value 202 is printed out by the calibration machine 102 and the patch is color-measured. Also, the Lab value 206 is equivalent to the Lab value in which the patch in which color matching is performed to the CMYK value 202 using the output profile 104 of the calibration machine 102 as the source profile, and the output profile 105 of the CMYK printer 106 as the destination profile, and printed out by the CMYK printer 106, is color-measured.

In short, the Lab value 203 is a color printed out by the calibration machine 102, and the Lab value 206 shows a color printed out in order to reproduce the color as the same color on the CMYK printer 106. And, each of the color matching images 205 and 207 is an image in which the printed-out color is simulated on the monitor.

In FIG. 3 showing the monitor display screen for color adjustment of a profile, the left side shows the color matching image 205 (original image), and the right side shows the color matching image 207 (preview image).

If the output profile 105 of the CMYK printer 106 is an ideal profile, the original image 205 and the preview image 207 must coincide with each other on the monitor screen of FIG. 3 (though the color out of the color reproduction range of the CMYK printer 106 is excepted).

However, actually, since the accuracy of the profile prepared by profile preparation software is not sufficient, and it is a limit of accuracy by CLUT, part that not coincide, appears between the original image 205 and the preview image 207.
(Detection of Adjusted Color Using Color Difference as Index)

Although it is good if the part in which color reproduction is different can be found by eye observation on the monitor, by evaluation only by eye observation, if not experienced, it is even difficult to detect a color to be adjusted.

Therefore, in this embodiment, in order to make it easy to detect the color to be adjusted, an area in which color difference is large is blinked on the preview image 207.

Figure 4:
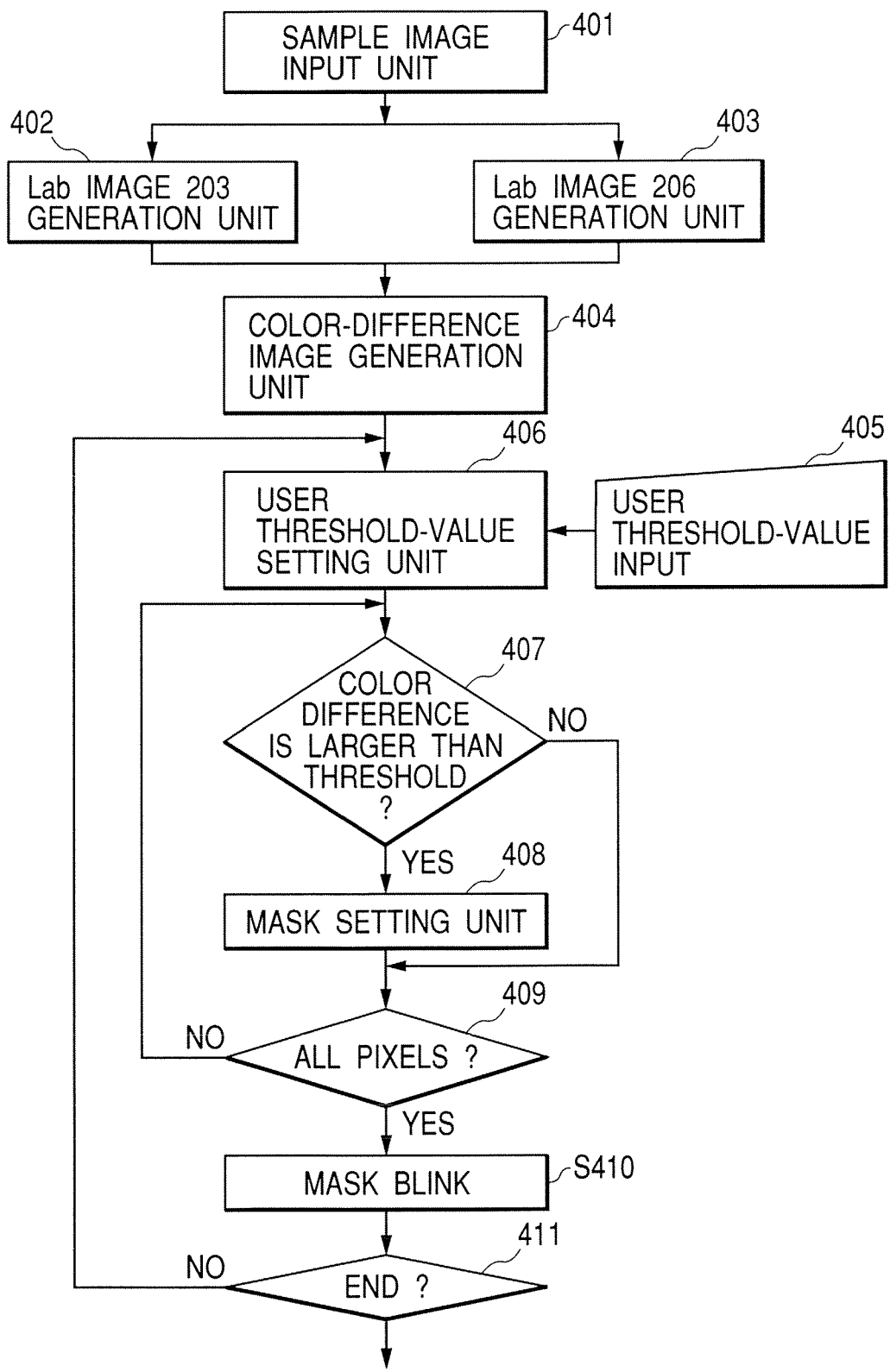
FIG. 4 is a processing flow for detecting an area in which color difference is large.
Figure 5:
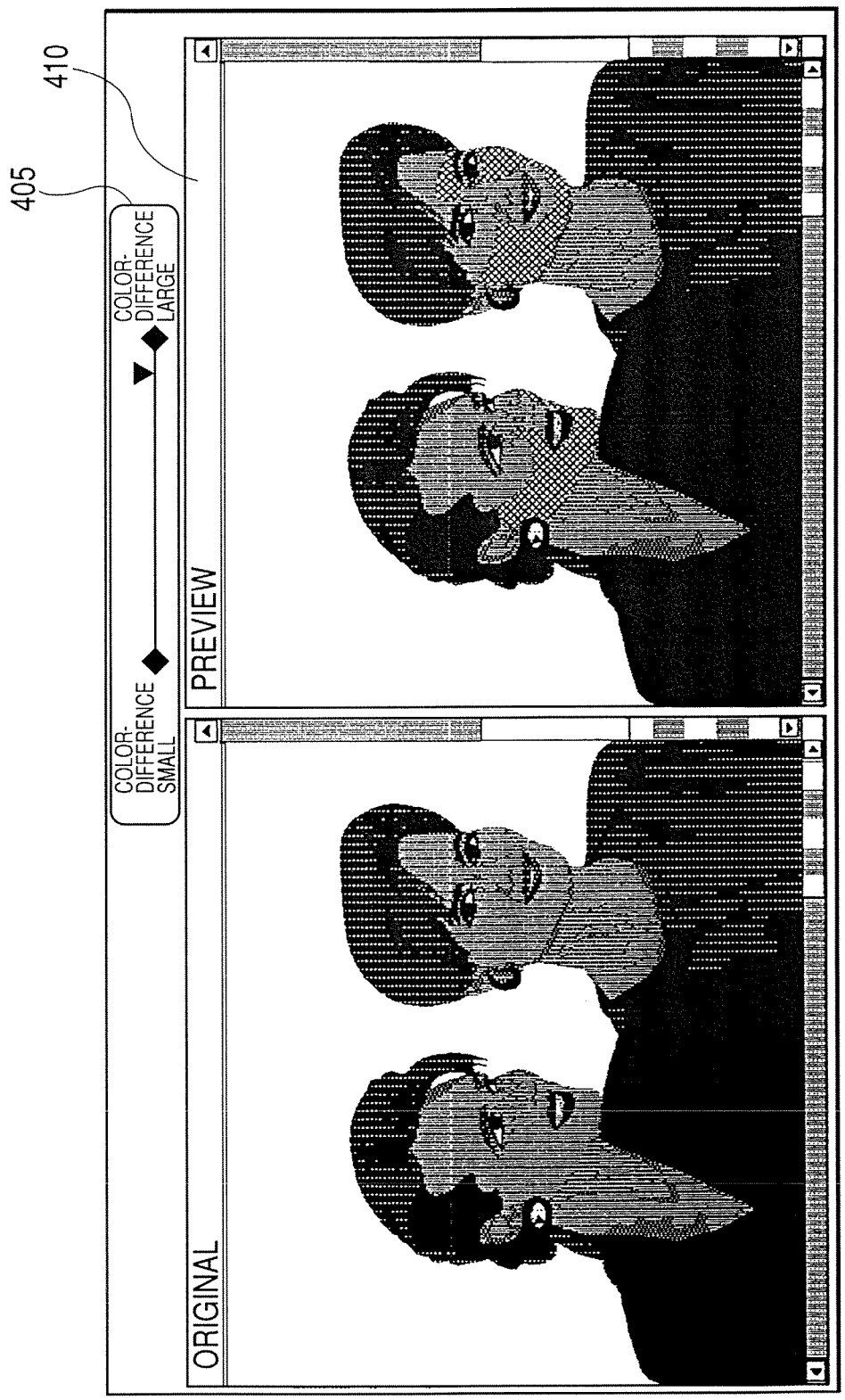
FIG. 5 is a monitor display screen when the area in which color difference is large is detected.

FIG. 4 shows processing for blinking the area in which color difference is large. Besides, FIG. 5 shows a monitor screen display when the area in which color difference is large, is blinked.

In a sample image input unit 401, the sample image data 202 for color adjustment is read in. Next, following processing of FIG. 2, the original image 205 and the preview image 207 are generated. Upon this, in a Lab image 203 generation unit 402, processing for generating the Lab image 203 from the sample image data 202, is performed. In a Lab image 206 generation unit 403, processing for generating the Lab image 206 from the sample image data 202, is performed.

Note that, in processing of FIG. 4, in order to perform generation processing of the original image 205 and the generation processing of the preview image 207 in parallel, the Lab image 203 generation unit 402 and the Lab image 206 generation unit 403 are separately provided.

Next, by a color-difference image generation unit 404, color difference is obtained to each pixel of the Lab image 203 and the Lab image 206. When it is supposed that a Lab value of the Lab image 203 is $(L_1, a_1, b_1)$ and the Lab value of the Lab image 206 at the same position as the Lab value of the Lab image 203 is $(L_2, a_2, b_2)$, using, for example, an CIE94 color-difference equation, color difference can be obtained as follows.

$$\Delta E = \sqrt{\left(\frac{\Delta L}{1.0}\right)^2 + \left(\frac{\Delta H}{1+0.015 \times C_1}\right)^2 + \left(\frac{\Delta C}{1+0.045 \times C_1}\right)^2} \quad \text{(Equation 1.1)}$$

where $$\Delta L = L_2 L_1 \quad \text{(Equation 1.2)}$$

$$\Delta H = H_2 H_1, \quad \text{(Equation 1.3)}$$

and $$\Delta C = C_2 C_1. \quad \text{(Equation 1.4)}$$

But, since, in the color out of the color reproduction range, color difference can not be made zero even if an ideal profile has been used, utilizing the color reproduction range information (gamut Tag) of the output profile 105 of the CMYK printer 106, in case that the Lab value $(L_1, a_1, b_1)$ is out of the color reproduction range, a flag indicating that it is out of the color reproduction range is set in place of the value of color difference.

Besides, in this embodiment, although the Lab image 203 and the Lab image 206 are temporarily held, the Lab image 203 and the Lab image 206 may be obtained from the sample image 201 to each pixel, and color difference may be directly calculated to generate a color difference image. Besides, the utilized color difference equation may also be by Euclid distance to the Lab values of two points.

In this embodiment, for simplifying processing, color difference obtained to each pixel is normalized as follows by the maximum color difference $\Delta E_{max}$ and the minimum color difference $\Delta E_{min}$ in the pixel.

$$\Delta E_{normalized} = (\Delta E - \Delta E_{min})/(\Delta E_{max} - \Delta E_{min}) \quad \text{(Equation 1.5)}$$

Next, by a user threshold-value input 405, a threshold value that a user want to detect is input (see 405 of FIG. 5). When a slider bar is moved in a color difference increase direction, color difference as the threshold value increases. When the slider bar is moved in a color difference decrease direction, color difference as the threshold value decreases.

The threshold value designated by the user is set by a user threshold-value setting unit 406, and it is compared (407) with the value of a color difference image generated by a color-difference image generation unit 404. And, by a mask setting unit 408, if the value of the color difference image is larger than the threshold value, mask setting is performed to the preview image 207, and if below the value of the color difference image, mask setting is not performed. Here, in the color difference image, as for a pixel for which a flag out of the color reproduction range is set, processing of mask setting is skipped. When comparison is completed to all pixels (409), on the basis of information on set mask, mask blink (S410) is performed on the preview image 207 (410 of FIG. 5). And, at need, the user resets the threshold value.

Note that, in this embodiment, although the value of the color difference image is normalized, it may not be normalized and the user may directly set the value of color difference. Besides, the feedback method to the user is not limited to mask blink.

By performing mask blink to the preview image, since the user can rapidly and objectively detect an area in which color difference is large, it becomes possible to color-adjust from a color in which color difference is large.

(Color Adjustment Method of B2A Data)

Color adjustment of a profile by eye observation is performed with comparing the original image 205 and the preview image 207 so that the preview image 207 may approach the original image 205 by color adjustment. Also, in color adjustment of the profile by color difference evaluation, color adjustment of the Lab value 206 is performed so that color difference between the Lab value 203 and the Lab value 206 may decrease. And, by results of color adjustment being reflected to B2A data of the output profile 105, B2A data in which color adjustment is performed can be generated.

As a method for reflecting the color adjustment results to the B2A data of the output profile 105, a method utilizing a color adjustment profile as an example will be described.

Figure 6A:
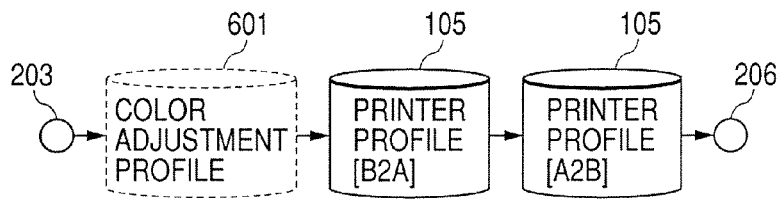
FIGS. 6A, 6B, 6C and 6D are conceptual views showing an example in which a color adjustment profile is utilized.

FIG. 6A shows a state that no color adjustment profile (Lab→Lab) is inserted. This is equivalent to a case in which a color adjustment profile 601 of through (input and output have the same value) is inserted.

Figure 6B:
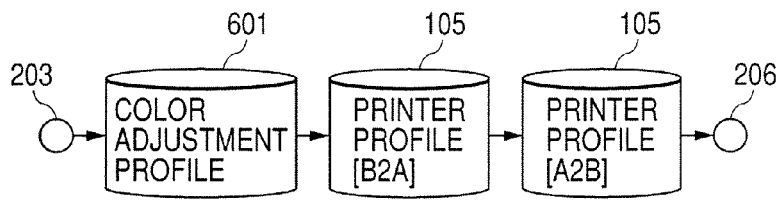

FIG. 6B shows a state that the color adjustment profile 601 (Lab→Lab) is added. In this state, contents of the color adjustment profile 601 are changed to perform color adjustment. But, since, in the color adjustment profile, the only input value (Lab) of B2A of the output profile is changed, an adjustment quantity in the color adjustment profile and the adjustment quantity of the adjusted color 206 by the color adjustment may not always coincide with each other.

Note that the color adjustment profile is not limited to Lab→Lab, and it may be from a device independent color space to a device independent color space.

Figure 13:
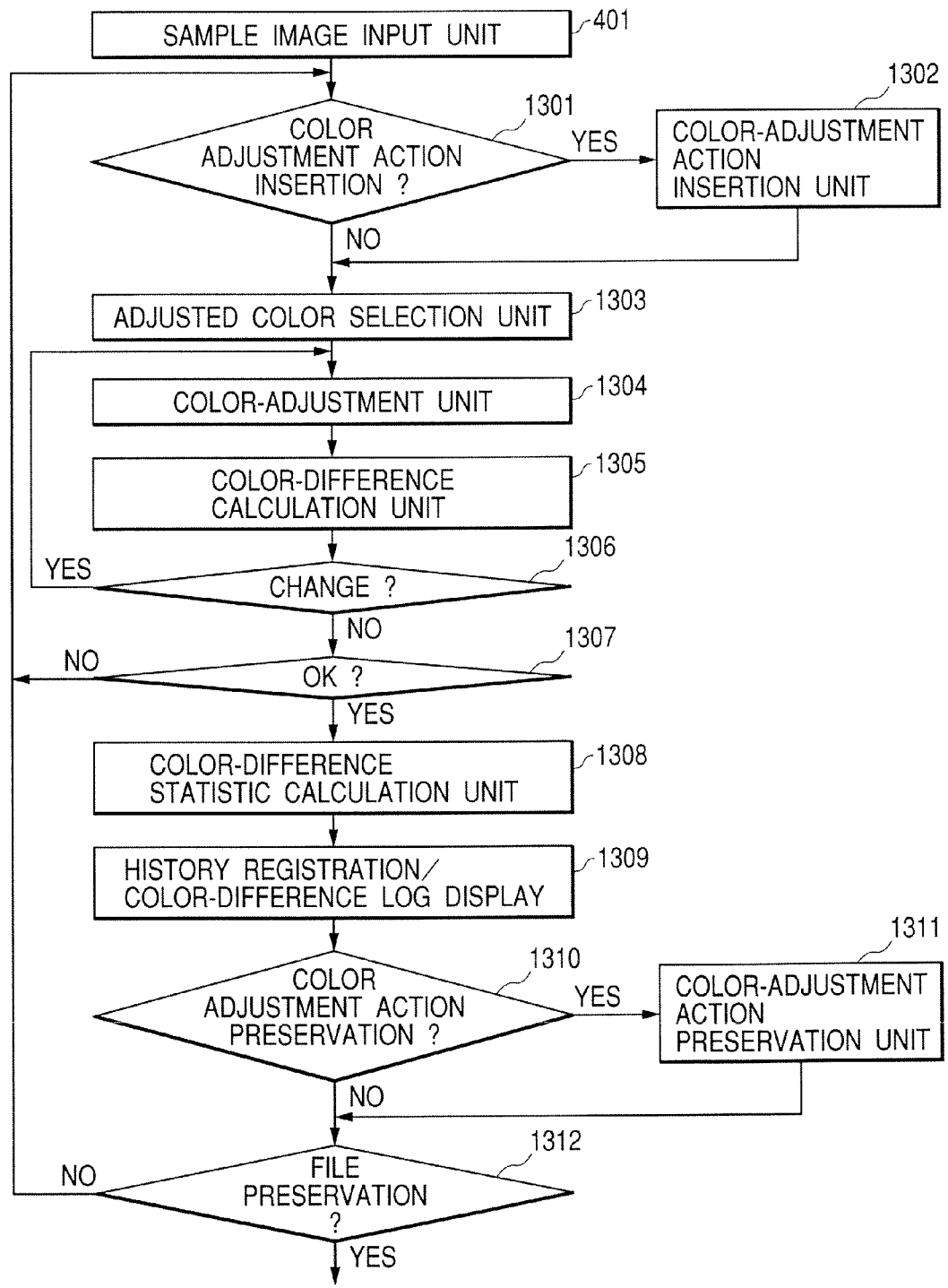
FIG. 13 is a processing flow showing the whole color adjustment.
Figure 14:
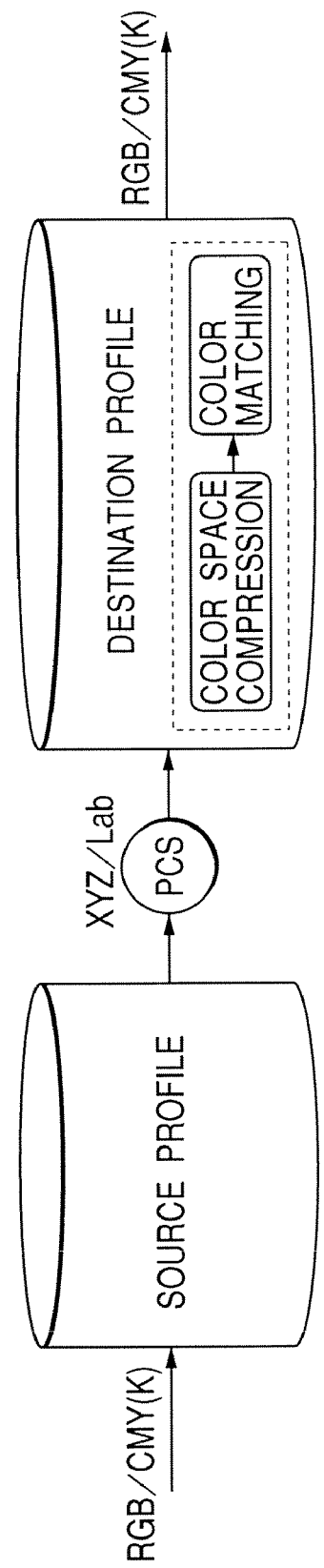
FIG. 14 is a conceptional view showing general color matching.

Hereinafter, local color adjustment by spot selection as an example will be described using steps 1303 to 1306 of FIG. 13.

By the above-described detection method of an adjusted color using color difference as an index, referring to mask blank and color difference of each pixel in the preview image, the user selects an adjusted color using spot selection 802 (an adjusted color selection unit 1303). From positional information on the spot-selected image, the Lab value 203 and the Lab value 206 corresponding to the spot-selected adjusted color are obtained. Color difference at the pixel position designated using the spot selection 802 (the value obtained by the equation 1.1) is displayed in ΔE (902) in an information window (901) of FIG. 9. The user can select the adjusted color using ΔE as a quantitative index.

Next, color adjustment is performed using a color adjustment unit 1304. First, adjustment conditions are set based on the adjusted color. In this embodiment, as the adjustment conditions, three parameters of influence range, weighting, and the adjustment quantity to the adjusted color, are used.

The influence range to the adjusted color is adjusted by a slider bar 803 of degree of influence. FIG. 7A shows CLUT (Lab→Lab) in a color adjustment profile. In case of spot selection, on a Lab color space, the influence range of color adjustment is represented as a sphere whose center is at the target color 203 to the selected adjusted color 206 and whose radius is degree of influence. When the degree of influence is increased, the adjustment quantity to the adjusted color goes to have an influence in a wider range.

Figure 9:
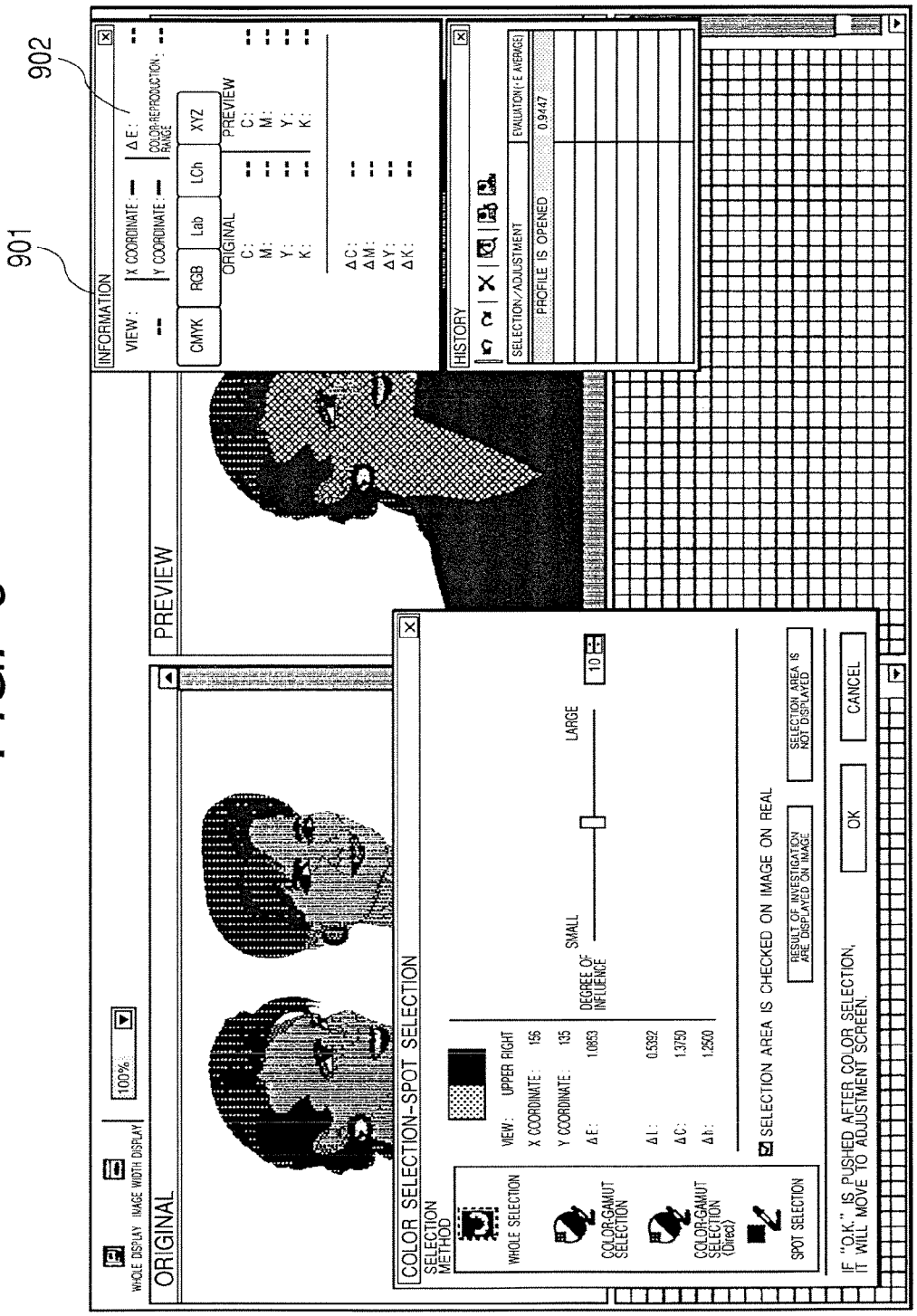
FIG. 9 is a monitor display screen upon color selection.

When the user designates the degree of influence by the slider bar 803 of degree of influence, it is judged whether or not each Lab value 203 of the sample image is within the influence range (sphere) of color adjustment. In case of inside, mask setting is performed, and it is informed to the user by mask blink or the like on the preview image 206 (FIG. 9). Thus, by performing mask blink, the user can visually be informed of the degree of influence of color adjustment, and can refer to it when the degree of influence is set.

Figure 10:
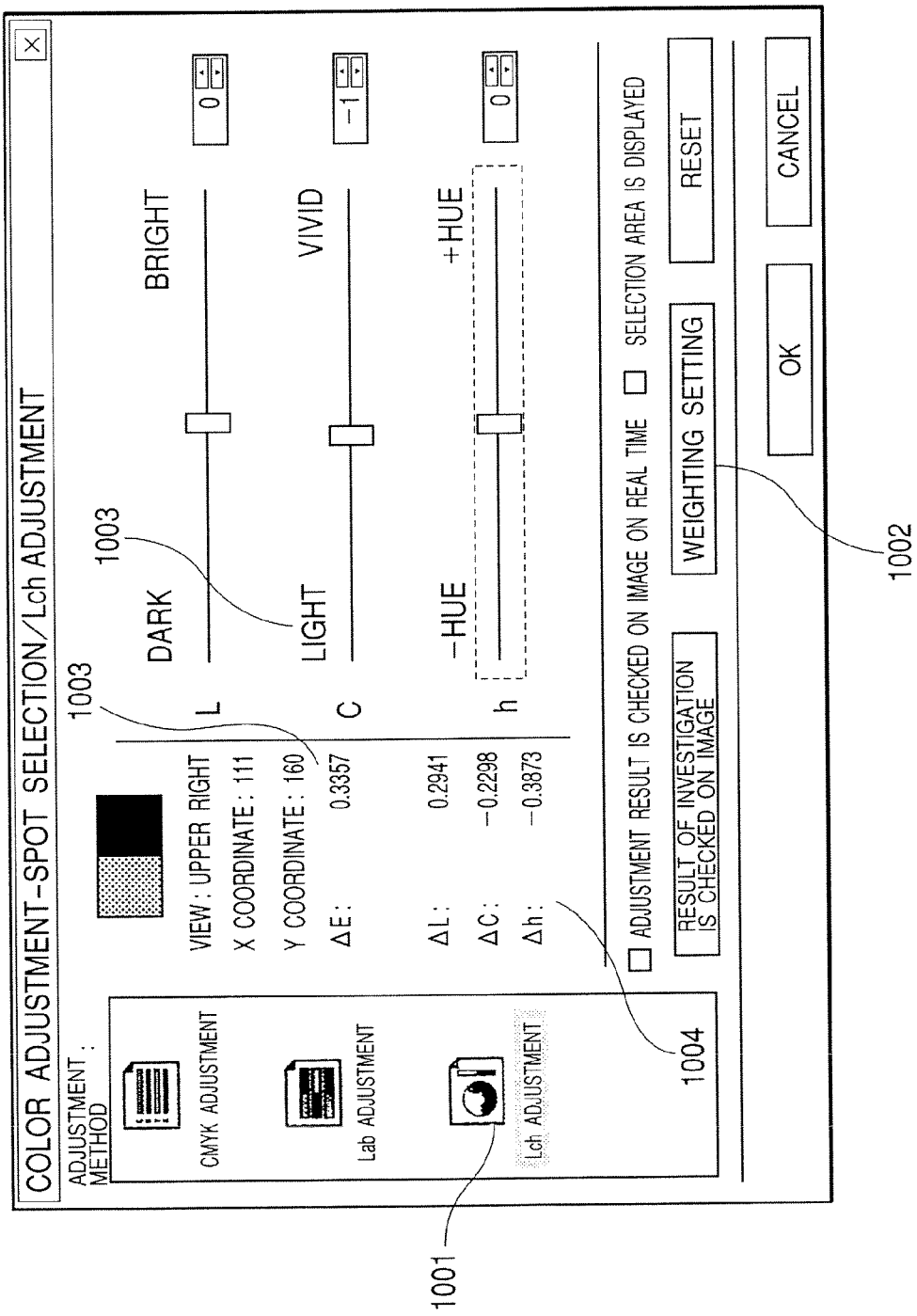
FIG. 10 is a user interface screen of color adjustment.

Next, using the screen shown in FIG. 10, the adjustment quantity to the adjusted color is determined. Here, LCh adjustment in which the adjustment quantity is set on an LCh color space, as an example, will be described.

The user can independently set an adjustment quantity to each of L (brightness), C (chroma), and h (hue). Upon this, referring to ΔE 1003, Δa, and Δh 1004 as hue of adjustment results, the user set the adjustment quantity. ΔL, Δa, and Δb 1004 can be obtained by converting each of the Lab value 203 and the Lab value 206 on the LCh color space, and obtaining the difference to each of the L, C, and h components.

Note that, in this embodiment, although LCh adjustment has been described, also in CMYK adjustment and Lab adjustment, only color space changes, and it is processed like LCh.

In case of Lab adjustment, an adjustment quantity can independently be set to each of the L, a, and b components. And, by obtaining the difference to each of the L, a, and b components of the Lab value 203 and the Lab value 206, ΔL, Δa, and Δb are calculated and displayed.

Thus, in this embodiment, in accordance with the color space of the adjustment method indicated by the user, displayed information is changed. By this, the user is made easy to set the adjustment quantity.

Although the influence range is represented in the color adjustment profile by the sphere whose center is the target color 203, only by selection of the adjusted color and designation of the degree of influence, it is not determined how the adjustment quantity is reflected in the sphere. The influence distribution in the sphere is determined by weighting setting 1002. FIGS. 7A and 7B show two-dimensional examples of influence distributions set by the weighting setting 1002.

FIGS. 7A and 7B show a Gaussian distribution (normal distribution) and a linear distribution, respectively. That is, in the color adjustment profile, to the target color 203, the adjustment quantity of the user is directly reflected, and the color around it is adjusted according to the influence distribution so that the influence may decrease as the distance increases. For example, in LCh adjustment 1005, when the brightness L to the adjusted color 206 is intended to be finely adjusted by about +5, the brightness L to an input of the target color 203 is finely adjusted by about +5, and in the color on the surrounding grid, the adjustment quantity changes in accordance with the distance from the target color. Also, as for chroma C and hue h, the color on the grid is adjusted according to the influence distribution.

Results of the color adjustment are reflected on the color adjustment profile 601 of through, and by performing processing of FIG. 6B, the color-adjusted preview image 207 can be obtained.

A color-difference calculation unit 1305 evaluates processing results of FIG. 6B every time when the user changes the value of color adjustment. More specifically, the Lab value 203 of the adjusted color selected by the color selection unit 1303 and the Lab value 206 color-adjusted are calculated by the equation (1.1), and they are displayed as ΔE of FIG. 10.

As the user uses this ΔE as an index, till the satisfactory preview image 207 is obtained, color adjustment is repeated (step 1306).

According to this embodiment, color adjustment is performed so that color difference may decrease. Although fine color adjustment was difficult in color adjustment by eye observation on the monitor, by introducing the quantitative index by color difference, color adjustment that was difficult by eye observation is possible.

(Color Adjustment History, Save/Insertion of Color Adjustment Action, and Color-Difference Log)

Figure 6C:
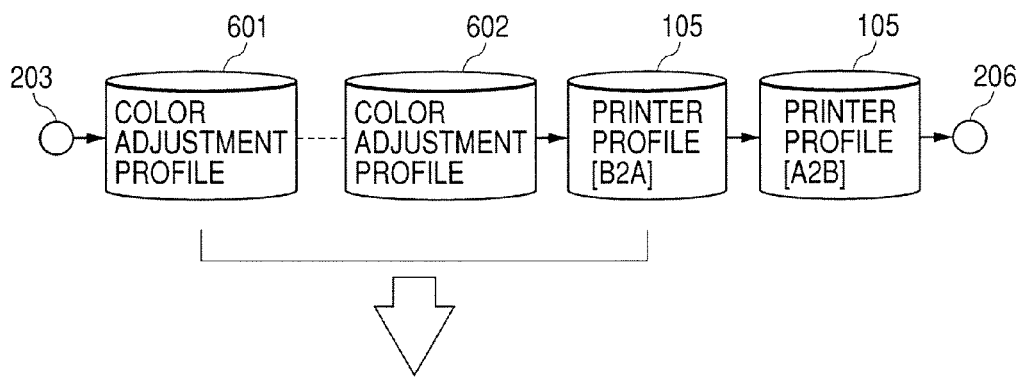
Figures 11, 12:
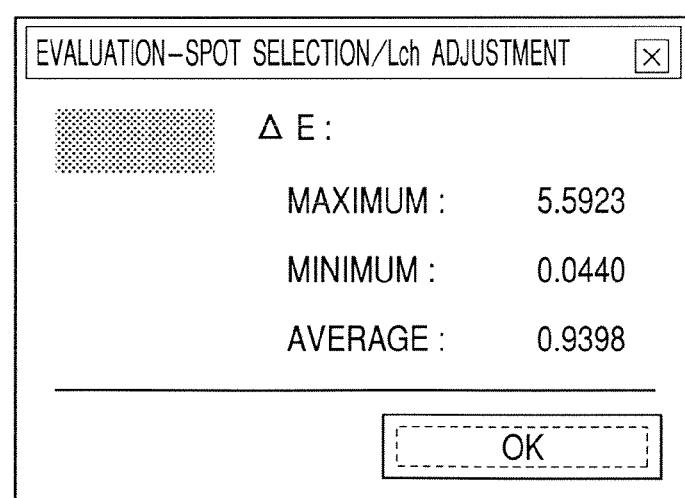
FIG. 11 is a monitor display screen showing a color adjustment history and color-difference log.
FIG. 12 is a display screen of color-difference statistic.

FIG. 6C shows a conceptional view of a color adjustment history, and FIG. 11 shows the color adjustment history and a color-difference log.

In FIG. 11, reference numeral 1101 denotes cancel of a color adjustment action, reference numeral 1102 denotes redo of the color adjustment action, reference numeral 1103 denotes display of a color-difference evaluation, reference numeral 1104 denotes insertion of the color adjustment action, and reference numeral 1105 denotes save of the color adjustment action.

As shown in FIG. 6C, every time when each color adjustment action performed by the user is determined (step 1307), it is added as a list of the color adjustment profile (step 1309). In case of canceling the color adjustment action last applied (1101), canceling can be executed by eliminating the color adjustment profile 602 last added, from the list. Also, one or more applied color adjustment actions can be canceled. In case of redoing the color adjustment action once canceled (1102), the color adjustment profile can be again added to the list.

At the same time, a color-difference statistic is calculated every time when each of various kinds of color adjustment actions performed by the user is determined (1308). As the color-difference statistic, average color difference within the color reproduction range, average color difference to the sample image, etc., can be selected.

As the average color difference within the color reproduction range, the Lab value equal to the whole color space is input, colors included in the color reproduction range are extracted from color reproduction information (gamut Tag) of the output profile 105 of the CMYK printer 106, and the average color difference of the original Lab value 203 and the preview Lab value 206 when processing of FIG. 6A or 6C is performed, is obtained.

As the average color difference to the sample image, colors included in the color reproduction range are extracted from the original image 203 of the sample image, and likewise the average color difference of the original Lab value 203 and the preview Lab value 206 is obtained.

As color-difference statistics, not only the average color difference but also the minimum color difference, the maximum color difference, the standard deviation, etc., are calculated at the same time. As shown in FIG. 11, the statistics obtained here are displayed as the color difference log together with the color adjustment history (1309).

By displaying the color difference log, it can be quantitatively judged whether or not the color adjustment performed by the user was effective adjustment. If the average color difference has increased, cancel of the color adjustment action is performed, and better color adjustment can be tried again.

Besides, by executing the display button (1103) of the color difference evaluation, not only the average color difference but also the statistics of the maximum color difference, the standard deviation, etc., can be displayed. FIG. 12 is an example of display of a color difference evaluation.

Further, by selecting an optional color adjustment action of the color adjustment history, and executing the display button of the color difference evaluation, the statistics at the time of the selected color adjustment action can be displayed as shown in FIG. 12.

In case that the same color adjustment is intended to be used for another profile, or an color adjustment action is intended to be reused, the color adjustment profile list can be saved on an external storage device (1105 of FIG. 11, and 1310, 1311 of FIG. 13), or insertion to the present color adjustment profile list from the external storage device (1104 of FIG. 11, and 1301. 1302 of FIG. 13) is also possible. Here, in case of saving the color adjustment profile list consisting of a plurality of color adjustment actions, the user can select (1312) whether the color adjustment profile list (601 to 602) is saved as it is, or the color adjustment profile list (601 to 602) is saved after it is synthesized into one color adjustment profile.

(Profile Saving after Color Adjustment)

Figure 6D:
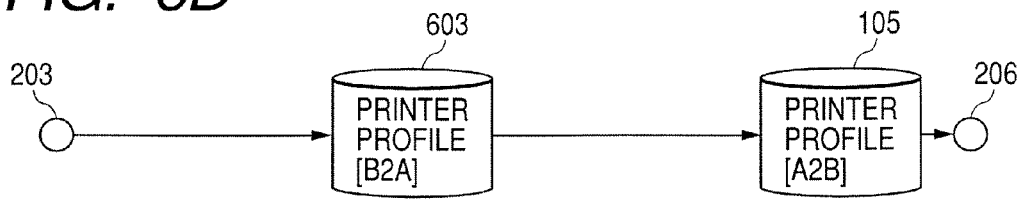
Figure 8:
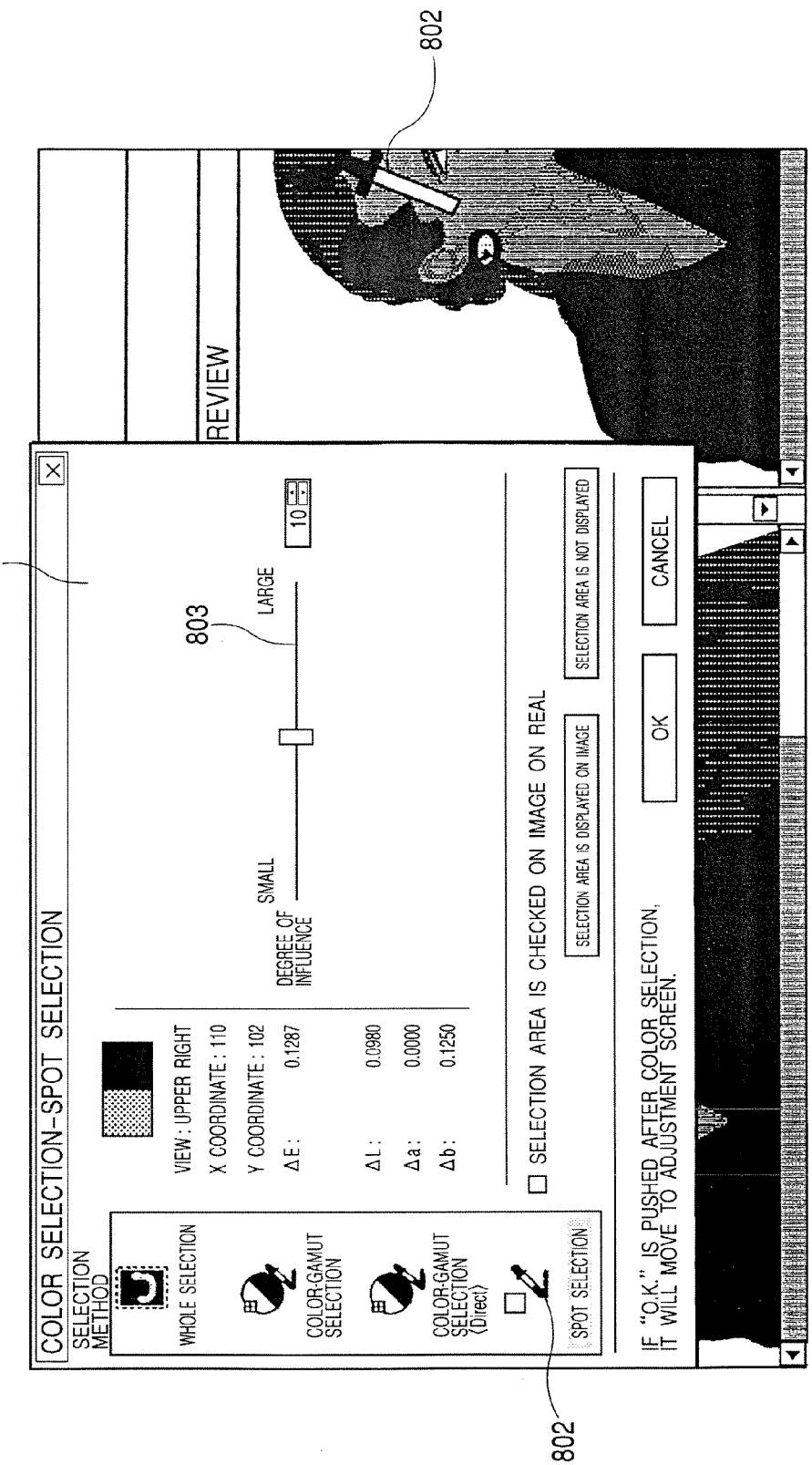
FIG. 8 is a user interface screen of color selection.

As shown in FIG. 6D, by synthesizing the color adjustment profile list (601 to 602) and the output profile 105 of the CMYK printer 106, and updating the output profile 105 by the synthesized results, a profile (603) after color adjustment can be obtained.

As described above, according to this embodiment, by utilizing color difference upon color adjustment, a quantitative evaluation not influenced by the experience and sensitivity of the user can be performed. In addition, by calculating the color difference between the original image and the preview image, by detecting an area in which the color difference is large in the sample image, and informing the user, it makes it easy for the user to select the adjusted color.

Since the user is informed of the color adjustment results of the profile by color difference, the adjustment results can quantitatively be evaluated. In particular, since the user is informed of various color difference statistics as evaluation values, the user can evaluate from various viewpoints. In the average color difference, by displaying the color difference statistic to the inside of the color reproduction range (excluding the outside of the color reproduction range from the calculation objects), a more specifically quantitative evaluation can be performed.

Further, since the history of adjustment is history-displayed together with the evaluation value, a quantitative evaluation can be performed upon each adjustment, and the user can easily check the adjustment history.

Other Embodiments

It is also within the scope of the present invention that a computer in an apparatus or system connected with various devices in order to operate the various devices to realize functions of the above-described embodiment is supplied with software program codes for realizing the functions of the above-described embodiment, and the computer (CPU or MPU) of the system or apparatus operates the various devices in accordance with the installed program.

In this case, since the software program codes themselves are to realize the functions of the above-described embodiment, the present invention includes the software program codes themselves and means for supplying the program codes to the computer, for example, a storage medium storing the program codes.

As the storage medium storing the program codes usable are, for example, a floppy disk, a hard disk, an optical disk, a magneto-optical disk, a CD-ROM, a magnetic tape, a non-volatile memory card, a ROM, etc.

Besides, not only in case that the functions of the above-described embodiment are realized by the computer executing the supplied program codes, but also in case that the program codes cooperate with the OS (Operating System), another application software program, or the like, operating on the computer, to realize the functions of the above-described embodiment, it is needless to say that the program codes are also included in embodiments of the present invention.

Further, it is needless to say that the present invention includes also a case in which the supplied program codes are stored in a memory provided in a function extension board of the computer or a function extension unit connected with the computer, then a CPU or the like provided in the function extension board or unit performs part or the whole of an actual process based on instructions of the program codes, and the functions of the above-described embodiment are realized by the process.

According to the present invention, upon adjustment of a profile, a quantitative evaluation not influenced by the experience and sensitivity of a user can be made.

Besides, by making it possible to register adjustment in a history, the history of adjustment can be checked.

What is claimed is:

1. A color processing device comprising:
   an acquisition unit adapted to acquire conversion data for converting device independent color data into device dependent color data;
   a creation unit adapted to create adjustment data for converting the device independent color data into adjusted device independent color data, based on an adjusted color and an adjustment condition instructed by a user;
   a conversion unit adapted to convert input color data by using the acquired conversion data and the created adjustment data;
   an evaluation unit adapted to evaluate a result of the adjustment corresponding to the adjustment data, based on a color converted by the conversion unit; and
   a display unit adapted to display a history of the adjustment data and an evaluation corresponding to each of the adjustment data.

2. A color processing device according to claim 1, wherein the evaluation unit acquires a statistic of a color difference between the input color data and output color data of the conversion unit.

3. A color processing device according to claim 2, wherein the evaluation unit acquires the statistic of the color difference for the input color data within a color reproduction range of an output device.

4. A color processing device according to claim 1, wherein plural color different statistics are displayed for the adjustment data selected from the displayed history, in response to a user's instruction.

5. A color processing device according to claim 1, further comprising a storage unit adapted to synthesize the adjustment data and the conversion data and store therein the synthesized conversion data.

6. A computer-readable storage medium storing a program to execute a color processing method performed by a processor of a computer comprising:
   acquiring conversion data for converting device independent color data into device dependent color data;
   creating adjustment data for converting the device independent color data into the adjusted device independent color data, based on an adjusted color and an adjustment condition instructed by a user;
   converting input color data by using the acquired conversion data and the created adjustment data;
   evaluating a result of the adjustment corresponding to the adjustment data, based on a converted color; and
   displaying a history of the adjustment data and an evaluation corresponding to each of the adjustment data.

7. A color processing method performed by a processor comprising:
   acquiring conversion data for converting device independent color data into device dependent color data;
   creating adjustment data for converting the device independent color data into the adjusted device independent color data, based on an adjusted color and an adjustment condition instructed by a user;
   converting input color data by using the acquired conversion data and the created adjustment data;
   evaluating a result of the adjustment corresponding to the adjustment data, based on a converted color; and
   displaying a history of the adjustment data and an evaluation corresponding to each of the adjustment data.

* * * * *